United States Patent [19]
Hofius, Sr. et al.

[11] Patent Number: 5,423,938
[45] Date of Patent: Jun. 13, 1995

[54] HOT AIR COLD FORM STAKING DEVICE

[76] Inventors: David V. Hofius, Sr., 235 Pierce Ave.; Mark W. Hofius, II, 429 Line St., both of Sharpsville, Pa. 16150

[21] Appl. No.: 106,595

[22] Filed: Aug. 16, 1993

[51] Int. Cl.⁶ ............................................. B32B 31/00
[52] U.S. Cl. ........................... 156/497; 156/359; 156/498; 425/143; 425/160; 425/508
[58] Field of Search ............... 156/359, 497, 498; 425/112, 143, 160, 508

[56] References Cited

U.S. PATENT DOCUMENTS

| | | | |
|---|---|---|---|
| 3,788,917 | 1/1974 | Linda | 156/497 X |
| 4,138,209 | 2/1979 | Bahr | 425/160 |
| 4,511,426 | 4/1985 | Linnér | 156/497 |
| 4,642,155 | 2/1987 | Ramsey | 156/359 |
| 4,767,298 | 8/1988 | Bocchicchio et al. | 425/112 |
| 4,804,435 | 2/1989 | Gelinas et al. | 156/497 X |
| 4,957,581 | 9/1990 | Jährig | 156/497 X |
| 4,972,990 | 11/1990 | Abbagnaro et al. | 228/20 |
| 5,018,957 | 5/1991 | Assink et al. | 425/112 |
| 5,225,025 | 7/1993 | Lambing et al. | 156/359 X |

Primary Examiner—David A. Simmons
Assistant Examiner—Paul M. Rivard
Attorney, Agent, or Firm—Harpman & Harpman

[57] ABSTRACT

A hot air cold form pin welding device for use in assembly of work pieces using thermoformable and pressure deformable synthetic resin studs. A hot air heater is positioned in a support structure that isolates heat transfer along with multiple power and air cycling to reduce heat build-up. The cold forming pin assembly with internal heat dissipation and airflow structure forms and presses a replasticized pin significantly reducing the cold pin press cycle time.

8 Claims, 2 Drawing Sheets

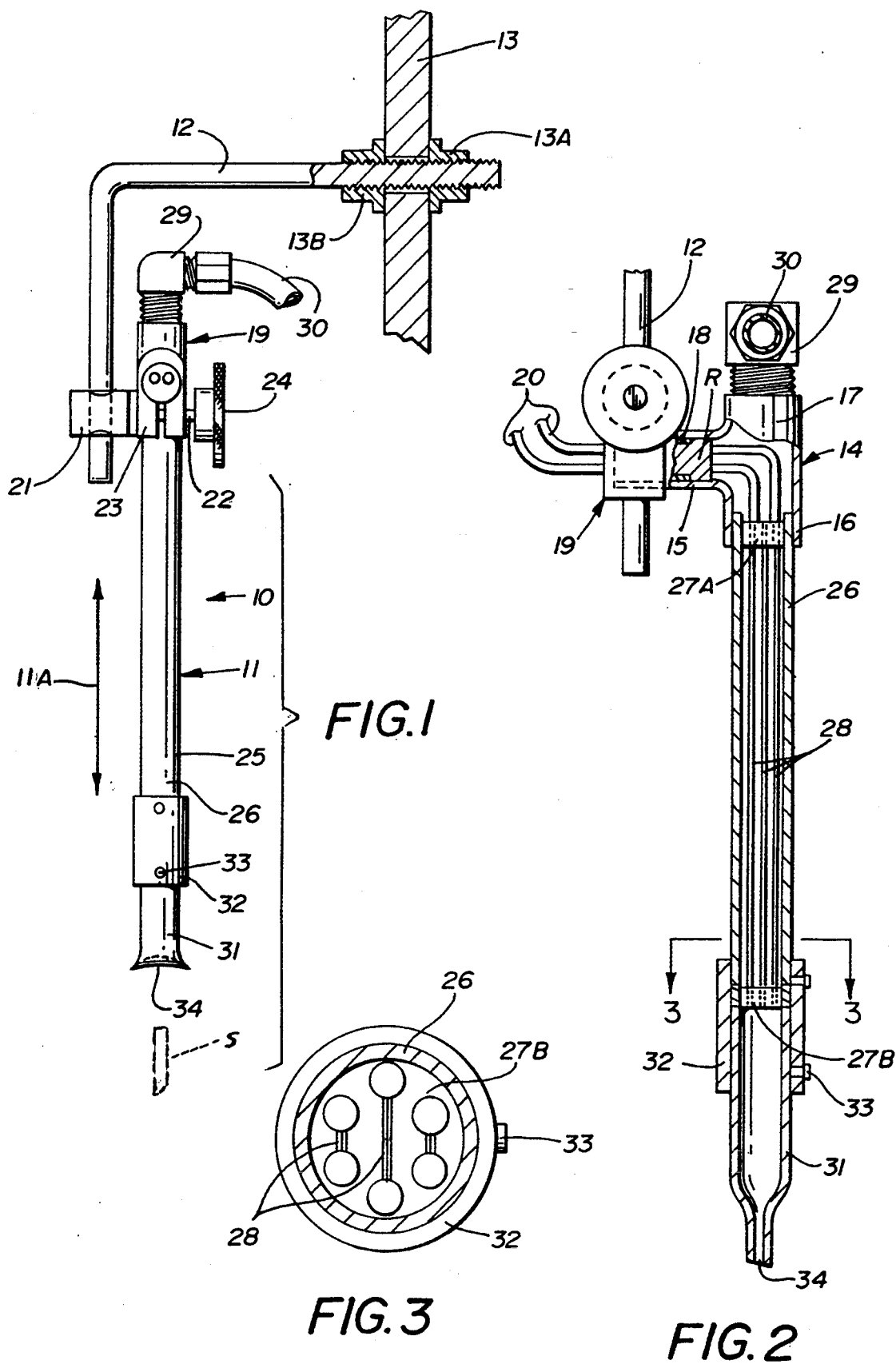

5,423,938

HOT AIR COLD FORM STAKING DEVICE

BACKGROUND OF THE INVENTION

1. Technical Field

This device relates to hot staking techniques for joining work pieces of material together utilizing concentrated and directed hot air heaters to soften spaced studs which have been inserted through apertured and then deforming the softened studs by cold pin assembly thus securing the work pieces together.

2. Description of Prior Art

Prior art devices of this type have used a variety of different hot staking configurations using multiple air heaters, reciprocation assemblies and insulated structures, see for example U.S. Pat. Nos. 5,018,957 and 4,767,298.

In U.S. Pat. 4,767,298 a heat staking apparatus is disclosed that uses multiple heating elements arranged in zones that are programmable for temperature and displacement for maximum deformation of variant synthetic resin materials. U.S. Pat. No. 5,018,957 is directed to a hot staking machine using an assembly of air heaters and air driven staking tools. A hot air vent tube is pointed laterally of the surface to be heated. An air driven cylinder is aligned for recyclable engagement with the heated work piece.

SUMMARY OF THE INVENTION

A hot air, cold form press pin device for heating and deformation of fastening studs to form weld configurations. Air heaters are electrically cycled for both power and airflow to maintain a constant stable operating temperature without excessive heat build-up for consistent weld performance on the first work piece as well as the last. Pressed pin tool assemblies have interchangeable forming pins with available adiabatic cooling, if needed, for consistency of deformation of plasticized studs.

DESCRIPTION OF THE DRAWINGS

FIG. 1 is a side plan view of a hot air heater and mounting assembly;

FIG. 2 is a cross-sectional view of the hot air heater and adjacent mounting configuration;

FIG. 3 is an enlarged cross-section on lines 3—3 of FIG. 2 illustrating the heat elements within;

DESCRIPTION OF THE PREFERRED EMBODIMENT

Figure 5:
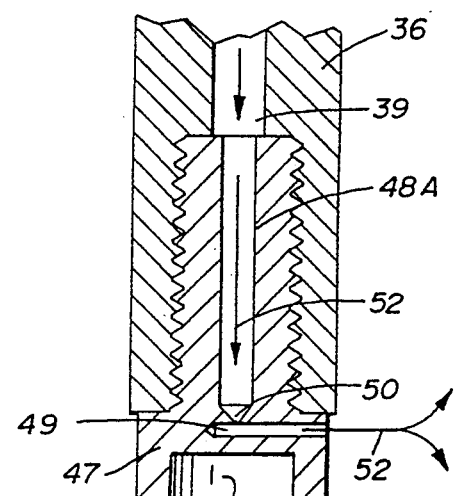
FIG. 5 is an enlarged cross-sectional view on lines 5—5 of FIG. 4 illustrating adiabatic cooling of the pin tip.

Referring now to FIGS. 1,2, and 5 of the drawings, a hot air welding tool 10 can be seen having a hot air heater 11 secured to a support and positioning rod 12 which is adjustably mounted and supported from a heater tool plate 13 by opposing flange nuts 13A and B. The hot air welding tool 10 is advanced towards and away from a work piece (stud) S as indicated by directional arrow 11A.

The hot air heater 11 has a T-shaped mounting fixture 14 defining three sections 15,16 and 17 respectively. The mounting fixture 14, section 15 has a mounting cylinder 18 extending therefrom which is removably engaged within an adjustable instrument clamp 19. The mounting cylinder 18 is filled with insulating epoxy resin R through which power supply wires 20 are embedded and which will be described in greater detail later.

The adjustable instrument clamp 19 is well known within the art having a rod engagement base 21, a threaded shaft 22 and U-shaped clamp elements 23. An engagement knob 24 is spring-loaded on said threaded shaft by which rotation of same will simultaneously compress the U-shaped clamp elements 19 and tighten the rod engagement base 21. The foregoing allows adjustability of the hot air heater 11 within the instrument clamp 19 and related supported rod 12 allows for multiple axial alignment of the hot air heater 11 in relation thereto. The hot air heater 11 comprises a heating element 25 extending from said mounting fixture 14, section 16 at right angles to said hereinbefore described mounting cylinder 18. The heater element 25 is an outer tubular housing 26 with a pair of spaced multiple apertured wire guides 27A and B positioned within as best seen in FIGS. 2 and 3 of the drawings. A heating filament 28 extends longitudinally back and forth within said housing 26 through said respective apertured guides 27A and B which are suspended in spaced longitudinal alignment within the outer tubular housing 26. The heating element 25 400 to 800 watts with a direct airblast temperature of approximately 400 to 1000 degrees which is required to adequately deform a stud.

An air supply fitting 29 is threadably secured within the mounting fixture 14, section 17 with an air line 30 extending from said fixture's free end to a source of compressed air (not shown).

An air needle 31 extends from the free end of said heater element 25 secured thereto by a slip sleeve 32 having locking elements 33 therein interconnecting said tubular housing and said air needle 31 as will be well understood by those skilled in the art. The air needle 31 is generally cylindrical with a contoured flange end at 34 to direct the flow of heated air.

In operation, low voltage (50 to 60 VAC) is supplied to the heater element 25 via the power supply wires 20 during warm up and stand-by to maintain a pre-determined temperature while higher voltage (120 VAC) is supplied during air activation for direct hot air blast as hereinbefore described. No air is supplied to the heater during warm up and stand-by. The low voltage power supply maintains and limits heat loss from the heater assembly due to the insulating properties of the mounting elements noted above.

Figure 4:
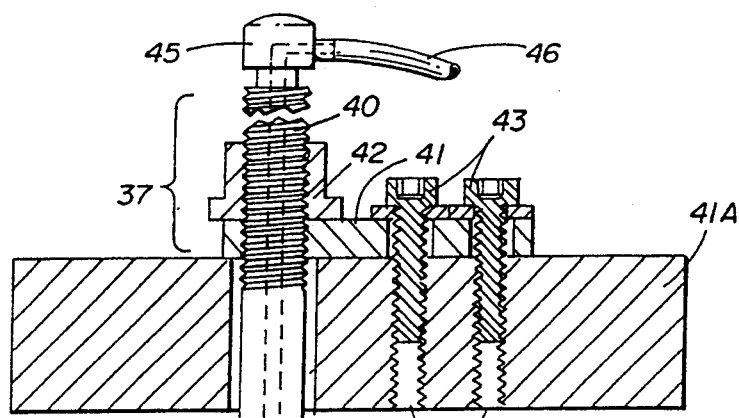
FIG. 4 is a side plan view of a cold press pin assembly and associated mounting structure.

Referring now to FIGS. 4 and 5 of the drawings, a press pin tool 35 can be seen having main elongated body member 36 with a mounting portion 37 and work engagement portion 38. A central bore 39 extends the length of said body member 36 which is threaded at 40, on which an apertured X-Y access adjustment plate 41 is threadably positioned by a flanged nut 42.

The adjustment plate 41 is secured to a pin tool plate 41A by adjustable multiple fasteners and washer assemblies 43 registerable within parallel spaced threaded bores at 44. An air supply fitting 45 is secured within said bore at 39 in the mounting portion 37 having an air supply line 46 extending therefrom to a source of air (not shown). The work engagement portion 38 of the main elongated body member 36 is best seen in FIG. 5 of the drawings having a cooling pin 47 threadably disposed within the bore 39. The cooling pin 47 is recessed at 48 defining a selective engagement area for the now heated stud of thermoplastic resin material. The cooling pin 47 has a central air passageway 48A in communication with said bore 39 and an exhaust passageway 49 intersecting same at 50 with venting to atmosphere indicated by the arrows 52. The point of intersection at 50 of the central air passageway 48A and exhaust passageway 49 is of a reduced diameter causing the fluid flow indicated by arrows 52 to accelerate therebetween in a "venturi effect" imparting adiabatic cooling to the surrounding cooling pin 47 shortening the form press cycle of the stud substantially as will be discussed in greater detail later.

It will be evident to those skilled in the art from the above description that in use the now cold press pin tool 35 is reciprocated vertically for engagement against the stud as indicated by directional arrow 53 in FIG. 4 of the drawings.

Figure 6:
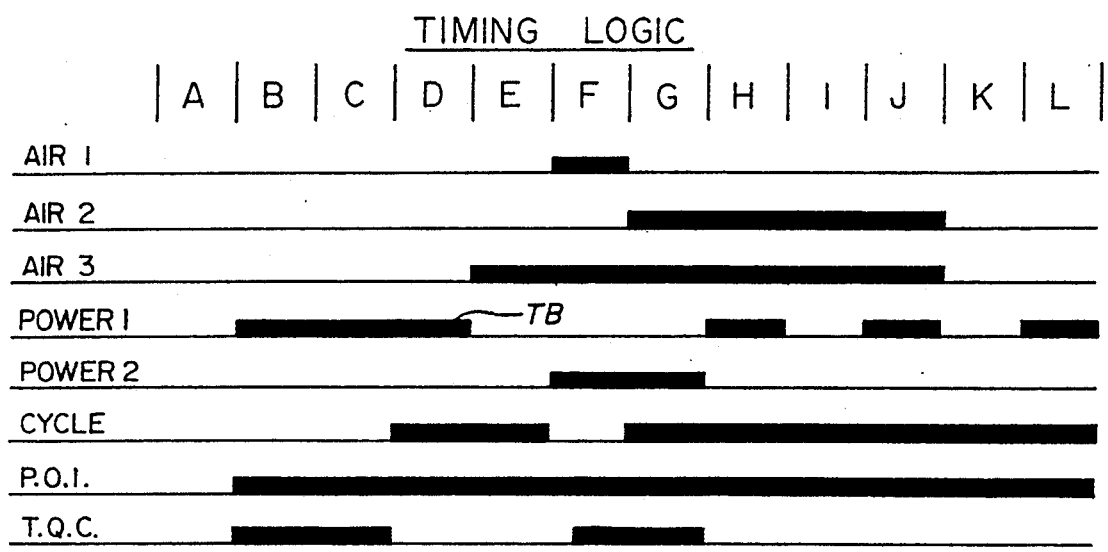
FIG. 6 is a graphic illustration of timing cycle of power, and air control of hot air heating cycling.

Referring to FIG. 6, a hot air cold forming press control and activation timing cycle is illustrated in a "timing logic" flow diagram in which air, and power flow control are indicated in the left vertical column while function i.e. weld, timing, tool positioning, etc. is shown in the horizontal steps A-L at the top of the graph.

Time block activation indicators TB extend horizontally illustrating the linear time relationship between the respective functions, and steps as follows.

A (hot air/cold form welder off)
B (hot air/cold form welder on)
C (hot air/cold form welder warming up)
D (hot air/cold form welder is at operational temperature i.e. stand-by)
E (hot air/cold form welder cycle initiated)
F (heater tool extended)
G (heater timer expired)
H (power boost timer expired)
I (cold forming press pin extended)
J (cool forming press pin time expires)
K (all tooling is retracted)
L (hot air weld cycle complete)

DEFINITION OF TIMING LOGIC GRAPH VERTICAL COLUMN AIR 1—T.Q.C.

Air 1 (air flow for hot air heater activation at F)
Air 2 (air to press pin tool activated for G,H,I,J)
Air 3 (air to hot air heater tooling plate for E,F,G,-H,I,J))
Power 1 (60 VAC to heating elements, for B,C,D, and H,J,L)
Power 2 (120 VAC to heating elements for F and G)
Cycle (offset below set point temp, for D,E,F and H-L) (warm-up of heaters complete)
POI (indicates power to welding device, for B-L)
TQC (indicates warm-up needed, for B,C, and G)(if needed)

It will be seen by the review of the time logic graph illustration of FIG. 6 that the hot air welding tool/press pin tool defines an integrated system having first work piece start-up and stand-by operation control; meaning that the system will not run until it is fully warmed up at D, FIG. 6 normally two to three minutes and will maintain the hot air heater 11 at the stand-by operating temperature. The hot air heater 11 will always be at the constant stand-by temperature no matter how long it waits without use, or on the ambient temperature surrounding the welder.

Accordingly, it will be seen that the first work piece (stud) will be the same as the thousandth due to the welding cycle start-up being always from stand-by idle (temperature, not losing energy to the tooling mass or changes of the environment temperature).

The welding system thus consumes less energy and no air during warm-up and stand-by modes. This is true because very little heat is transferred to the tooling from the hot air heater. A digital temperature controller monitors the heater temperature and controls when the low voltage (50-60 VAC) should be applied to the heaters. The heaters are able to be heated up to operating temperature without any airflow since low voltage is being applied to them during the warm-up and stand-by modes.

The cooling pin 47 on the pressed pin tool 35 is interchangeable with alternate replacement pin configurations (not shown) depending on the use requirement without losing critical XYZ mounting alignment.

The adiabatic cooling of the cooling pin 47 shortens the form/press pin cycle overall for increased efficiency and better productivity.

Thus it will be seen that a new and useful hot air cold form/press pin device has been illustrated and described and it will be apparent to those skilled in the art that various changes and modification may be made therein without departing from the spirit of the invention, therefore

I claim:

1. A hot air cold form pin welding device having an air heater tool and a press pin tool, said air heater tool comprising a heater support tooling plate, a support and positioning rod extending from said support tooling plate, a mounting fixture selectively secured to said support and positioning rod, an air heater supported by said mounting fixture in spaced relation thereto, said mounting fixture comprising a multiple apertured section, a spacer element extending from one apertured section of said multiple apertured section, an adjustable clamp interengaging said support and positioning rod and said spacer element, means for supplying said air heater with air, a nozzle pin extending from said air heater for directing a stream of hot air to a work piece, means for adjustably mounting said support and positioning rod to said heater support tooling plate, said press pin tool comprising a press pin tooling plate, an X-Y axis adjustment plate positioned on said press pin tooling plate, said X-Y axis adjustment plate being movable with respect to said pin tooling plate, a press pin supported by said X-Y axis adjustment plate, said X-Y axis adjustment plate being supported on said pin tooling plate, fastening means for adjustably securing said press pin tooling plate to said X-Y adjustment plate after said X-Y adjustment plate has been positioned on said tooling plate at a position which locates said press pin tool in a desired location, said fastening means including a threaded bore in said pin tooling plate, an adjustment plate bore in said adjustment plate which is larger in diameter than said threaded bore in said X-Y axis adjustment plate so said X-Y axis adjustment plate can be moved with respect to said tooling plate while said adjustment plate bore remains aligned with said threaded bore, and a threaded fastener extending through said adjustment plate bore and threadably coupled to said tooling plate and engaged with said X-Y axis adjustment plate to attach said X-Y axis adjustment plate to said tooling plate, said press pin comprising: a mounting portion engaged with said X-Y axis adjustment plate and a work engagement portion, means for adiabatically cooling said press pin, and means for controlling activation of said air heater and said cold form pin in relation to said work piece.

2. The hot air cold form pin welding device of claim 1 wherein said means for supplying air to said air heater comprises an air fitting and supply line extending from and in communication with one of said apertured sections of said mounting fixture.

3. The hot air cold form pin welding device of claim 1 wherein said means of adjustably mounting said support and positioning rod to said support tooling plate comprises multiple interengaging flanged nuts threadably engaged on said support and position rod extending through said support tooling plate.

4. The hot air cold form pin welding device of claim 1 wherein said means for cooling said press pin comprises interconnecting passageways within said press pin, said interconnecting passageways communicating with a bore extending through said mounting portion, said interconnecting passageways within said press pin venting to atmosphere, and a source of compressed air communicating with said central bore.

5. The hot air cold form pin welding device of claim 1 wherein said means for adjustably securing said press pin tooling to said press pin tooling plate comprises an X-Y axis adjustment plate and multiple fasteners and washer assemblies therein.

6. The hot air cold form pin welding device of claim 1 wherein said air heater includes an electric resistant wire to heat a passageway through which air is passed to a work piece.

7. The hot air cold form pin welding device of claim 1 wherein said air heater is insulated from said heater support tooling plate and said support and positioning rod by said spacer element and said adjustable clamp.

8. The hot air cold form pin welding device of claim 1 wherein said work piece is a thermoplastic resin stud softened by a hot air blast and deformed by said press pin.

* * * * *